United States Patent [19]

Kaneko

[11] Patent Number: 5,346,157
[45] Date of Patent: Sep. 13, 1994

[54] SPINNING REEL FOR FISHING

[75] Inventor: Kyoichi Kaneko, Tokyo, Japan

[73] Assignee: Daiwa Seiko, Inc., Tokyo, Japan

[21] Appl. No.: 856,565

[22] Filed: Mar. 24, 1992

[51] Int. Cl.5 .............................................. A01K 89/01
[52] U.S. Cl. .................................................... 242/232
[58] Field of Search ............... 242/232, 233, 231, 230, 242/305, 323

[56] References Cited

U.S. PATENT DOCUMENTS

| | | | |
|---|---|---|---|
| 3,255,982 | 6/1966 | Emry | 242/230 X |
| 3,603,018 | 9/1971 | Mercer | 242/323 X |
| 4,982,912 | 1/1991 | Urso | 242/231 |
| 5,154,369 | 10/1992 | Smith | 242/233 |

FOREIGN PATENT DOCUMENTS 59-29485 8/1984 Japan .
61-274638 12/1986 Japan .

Primary Examiner—Daniel P. Stodola
Assistant Examiner—Michael R. Mansen
Attorney, Agent, or Firm—Longacre & White

[57] ABSTRACT

A spinning reel for fishing including: a spool supported by a reel main body and making a traverse movement in accordance with the winding operation of a handle, a rotor rotatably supported by the reel main body and rotating in accordance with the winding operation of the handle, a bail supporting member rotatably mounted on a bail supporting arm of the rotor and to which a bail is secured, and a arrangement for urging the bail supporting member into a fishline winding position and a fishline releasing position. The reel further including: an engagement member having a portion for engaging with a fishline when the bail supporting member is located at the fishline releasing position; an urging member for urging the engagement member in the same direction as the rotating direction of the bail supporting member to a fishline releasing side; an interlocking member for interlocking the engagement member with the movement of the bail supporting member into the fishline releasing position or the fishline winding position; and a retaining member for retaining the engagement member at a fishline engaged position when the bail supporting member is located at the fishline releasing position.

5 Claims, 7 Drawing Sheets

SPINNING REEL FOR FISHING

BACKGROUND OF THE INVENTION

The present invention relates to a spinning reel for fishing and more particularly to a spinning reel for fishing in which the delivery of a fishline when fish hits upon the fishline and an operation suitable for the fish hitting upon the fishline are surely effected.

In the case where various kinds of fishes are caught by using a spinning reel, they have been fished in such a manner as described below. A fishline from a spool coupled to a device which is thrown into a predetermined point is brought into a state where it is possible to deliver the fishline with a bail raised, while the fishline is held by a prescribed holding power so as to be delivered smoothly to the pulling force due to the hit of fish. Under this state, when the fish bites at bait, the holding power to the fishline is so released that the fish can fully bite at the bait, and then, the winding operation of the reel is performed in response to the biting of the fish at the bait.

In convention, as a temporarily holding unit for holding a fishline so as to be delivered smoothly to the hitting of fish, for example, a technique disclosed in Japanese examined utility model publication No. Sho-59-29485 has been well known.

This temporarily holding unit comprises a cylindrical portion of a spool having a cut-out portion formed thereon and a holding portion with its end porting bent in a hook shape which is provided in the cut-out portion. The temporarily holding unit serves to apply a prescribed holding power to the fishline by holding a fishline between the end portion of this holding portion and the cut-out portion.

In the case where the hitting of the fish is waited for, there has been known a spinning reel disclosed in Japanese unexamined patent publication No. Sho-61-274638, in which a change-over mechanism adapted to release the drag force of a drag mechanism exerted on a spool so that the spool is brought into a free-state is provided in order to meet the fishing method similar to that mentioned above.

In case of the conventional spinning reel provided with the temporarily holding unit disclosed in the former mentioned above, when the fish hits upon a device, a fishline is disengaged from the temporarily holding unit, so that the fishline is delivered from a spool. When the winding operation of the fishline is not carried out in response to the pulling of the fish, a fishhook cannot be sufficiently put on the fish, and therefore, bait is taken away by the fish.

Since the conventional temporarily holding unit has no member for informing a fisherman of the disengagement of a fishline from the temporarily holding unit, if the fisherman is anxious about a pointer the like, he is liable to serious miss a timing in reel winding operation. As a result, the fishing result is unfortunately deteriorated because the fishes spit out their biting baits and so forth. Further, the holding operation of the fishline to a temporarily holding portion is troublesome and the fishline is readily damaged.

In the case of the conventional spinning reel disclosed in the latter described above, when the hitting of the fish is waited for, a drag force is released to bring a spool into a free-state, and after that, when the fishline is somewhat delivered in accordance with the hit of fish and the fish completely bites at bait, a drag mechanism is returned to an actuated-state by the rotating operation of a handle and the fishline is taken-up. However, there has been a problem in that in the case where the spool is brought into a free-state, while waiting for the hitting of fish, if the spool is excessively rotated in the fishline delivery direction, the fishline is entangled. Therefore, it is necessary to exert a drag force on the spool suitably so as not to excessively rotate the spool. Thus, there have been problems, in accordance with the conventional spinning reel of the latter, in that such a drag force affects an adverse influence on the hitting fish, which causes the biting of fish at the bait to be deteriorated and the fish to spit out the bait.

SUMMARY OF THE INVENTION

The present invention was made in order to solve these problems mentioned above.

Accordingly, it is an object of the present invention to provide a spinning reel for fishing in which a temporarily held fishline is smoothly delivered without exhibiting unnaturalness to the hitting of fish, the biting of fish at bait is made good, a fisherman is so informed of the hitting of fish as to enable him to timely conduct in response to the information and the information can be automatically released.

The spinning reel for fishing according to the first aspect of the present invention including a spool supported by a reel main body and making a traverse movement in accordance with the winding operation of a handle, a rotor rotatably supported by the reel main body and rotating in accordance with the winding operation of the handle, a bail supporting member rotatably mounted on a bail supporting arm of this rotor and to which a bail is secured and a distribution-urging member for distribution-urging the bail supporting member into a fishline winding position and a fishline releasing position, further includes: an engagement member having a fishline engaging portion for engaging with the fishline when the bail supporting member is located at the fishline releasing position; an urging member for urging the engagement member in the same direction as the rotating direction of the bail supporting member to a fishline releasing side; an interlocking member for interlocking the engagement member with the fishline releasing position or the fishline winding position of the bail supporting member; and a retaining member for retaining the engagement member at the fishline engaged position when the bail supporting member is located at the fishline releasing position.

A spinning reel for fishing according to the second aspect of the invention is characterized in that the engagement member is rotatably supported concentrically to the bail supporting member.

A spinning reel for fishing according to the third aspect of the invention is characterized in that the engagement member is pivotally supported to the bail supporting arm so as to be shifted from an axis of the bail supporting member.

A spinning reel for fishing according to the fourth aspect of the invention is characterized in that the urging member in the first aspect can adjust its urging force.

A spinning reel according to the fifth aspect of the invention is characterized in that the spinning reel in the first aspect further comprises: a fishline releasing position detecting member for outputting a fishline releasing position signal when the bail supporting member is located at the fishline releasing position; an engagement member rotation detecting member for detecting that the engagement member is rotated to a position in which the fishline is released from the fishline engaged position in accordance with the pulling force of fish due to the hitting of the fish to thereby output an engagement member rotation signal; a hitting detecting unit for outputting a hitting detecting signal when the fishline releasing signal is input and the engagement member rotation signal is input; an information unit for inputting the hitting detecting signal and informing of the hitting of the fish; and an information state releasing unit for outputting an information state releasing signal adapted to release the information state of the information unit when the engagement member rotation signal is input and the fishline releasing position signal is not input.

In the spinning reel for fishing according to the first aspect of the invention, when the pulling force of the fish caused by the hitting of the fish is exerted onto the fishline which is held in the fishline engaging portion of the engagement member under the state where the bail supporting member is located at the fishline releasing position, the engagement member is rotated in the direction for disengaging the fishline from the fishline engaged portion against the urging force of the engagement member urging member, so that the fishline is disengaged from the engagement member.

Then, when the engagement member is rotated to a position where the fishline is disengaged therefrom, the engagement member is returned to an original position in accordance with the urging force of the engagement member urging member.

After that, when the fish completely bites at the bait, the bail supporting member is returned to the fishline winding position from the fishline releasing position through a reversing mechanism by the operation of the handle or a direct manual operation. Then, the engagement member rotates by interlocking with the bail supporting member in accordance with the interlocking operation of the interlocking member of the bail supporting member, so that it is positioned at the fishline releasing position.

In the spinning reel for fishing according to the fourth aspect of the invention, it is possible for the engagement member urging member in the first aspect to adjust its urging force.

In the spinning reel for fishing according the fifth aspect of the invention, the fishline releasing position signal is output from the fishline releasing position detecting member under a state where the bail supporting member is located at the fishline releasing position.

When the pulling force of the fish caused due to the hitting of the fish is exerted onto the fishline retained in the fishline engaged portion of the engagement member, the engagement member rotates in the direction to disengage the fishline from the fishline engaged portion against the urging force of the engagement member urging member, so that the fishline is disengaged from the engagement member.

Then, when the engagement member is rotated to a position where the engagement member releases the fishline, the engagement member rotation signal is output from the engagement member rotation detecting member.

At this time, since the fishline releasing position signal and the engagement member rotation signal are simultaneously input to the hitting detecting unit, the hitting detecting signal is output from the hitting detecting unit and the information unit is operated to thereby inform a fisherman of the hitting of fish.

When the fish sufficiently bites at the bait, the bail supporting member is returned from the fishline releasing position to the fishline winding position through the reversing mechanism by the operation of the handle or a directly manual operation. The engagement member is thus rotated by interlocking with the bail supporting member in accordance with the interlocking operation of the interlocking member of the bail supporting member so that it is located at the fishline releasing position.

Consequently, the engagement member rotation signal is output to the information state releasing unit from the engagement member rotation detecting member. At this time, however, the fishline releasing position signal is not output from the fishline releasing position detecting member, so that the information state releasing signal is output from the information state releasing unit to thereby release the information unit.

DETAILED DESCRIPTION OF THE PREFERRED EMBODIMENTS

Embodiments of the present invention will be described in more detail with reference to the accompanying drawings.

Figure 1:
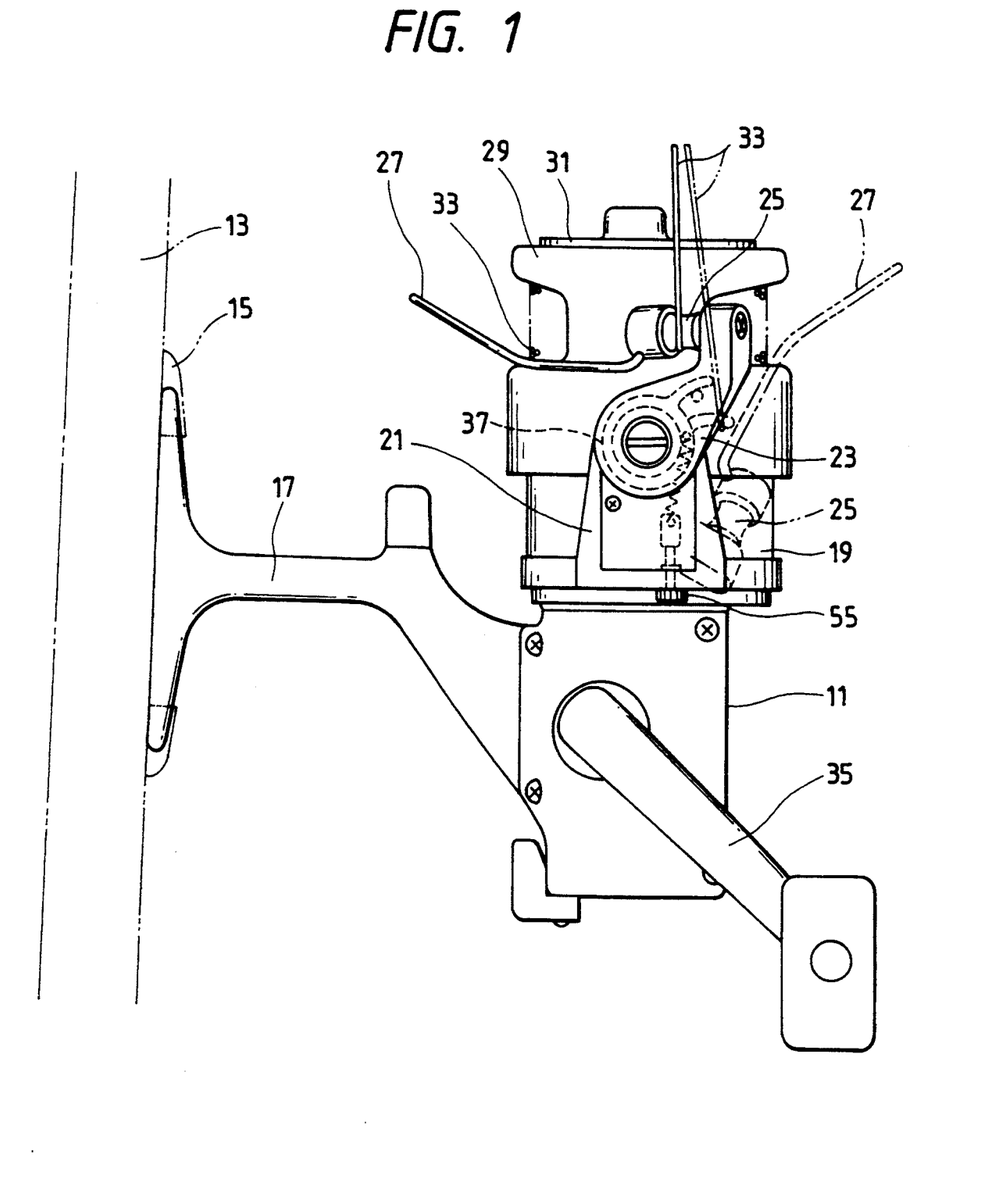
FIG. 1 is a side view showing a first embodiment of a spinning reel for fishing according to the present invention.

FIG. 1 shows an embodiment of a spinning reel for fishing according to the present invention. In the drawing, a reel main body 11 is mounted on the seat portions 15 of a fishing rod 13 through a leg portion 17.

To the front end of the reel main body 11 is pivotally coupled a rotor 19 so as to be rotatable. Bail support arms 21 are integrally formed with the rotor 19.

A bail supporting member 23 is rotatably mounted on the bail supporting arms 21. To the bail supporting member 23 is secured a bail 27 through a line roller 25.

A spool 29 is provided at a front end of the reel main body 11 concentrically with the rotor 19. This spool 29 is rotatably supported on a spool shaft (not shown) which is mounted on the reel main body 11 so as to make a traverse movement relative thereto.

The spool 29 is frictionally coupled to the spool shaft by a drag device 31 provided at the front end portion of the spool 29. The frictionally coupling force (drag force) can be freely adjusted by the drag device 31.

On the spool 29 is wound a fishline 33.

A handle 35 for winding the fishline is rotatably provided in the reel main body 11. A rotation shaft (not shown) of this handle 35 cooperates with the rotor 19 through a well-known gear mechanism not shown which is provided in the reel main body 11. Further, the spool shaft cooperates with the rotating shaft of the handle 35 through a well-known traverse mechanism not shown.

Figure 2:
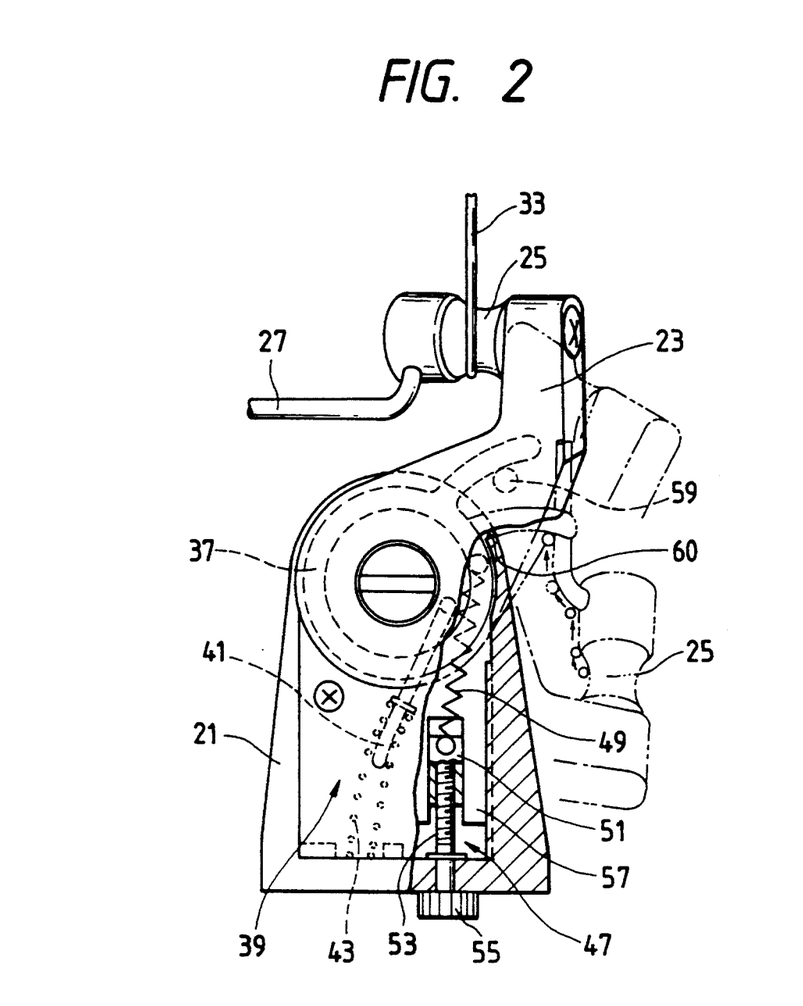
FIG. 2 is a side view showing a state in which a bail supporting member of the spinning reel of the first embodiment is located at a fishline winding position.
Figure 3:
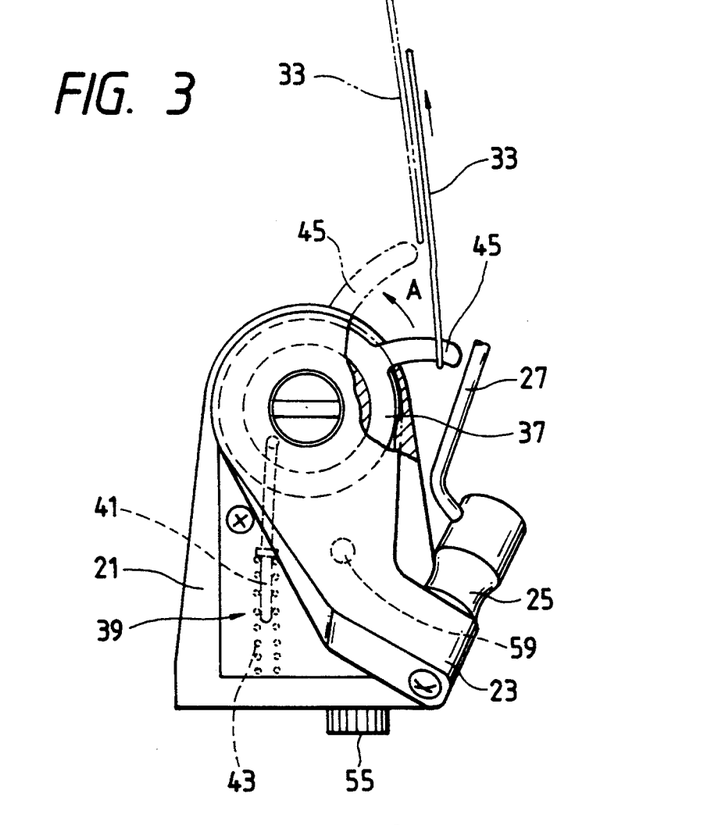
FIG. 3 is a side view showing a state in which the bail supporting member of the spinning reel of the first embodiment is located at a fishline releasing position.
Figure 4:
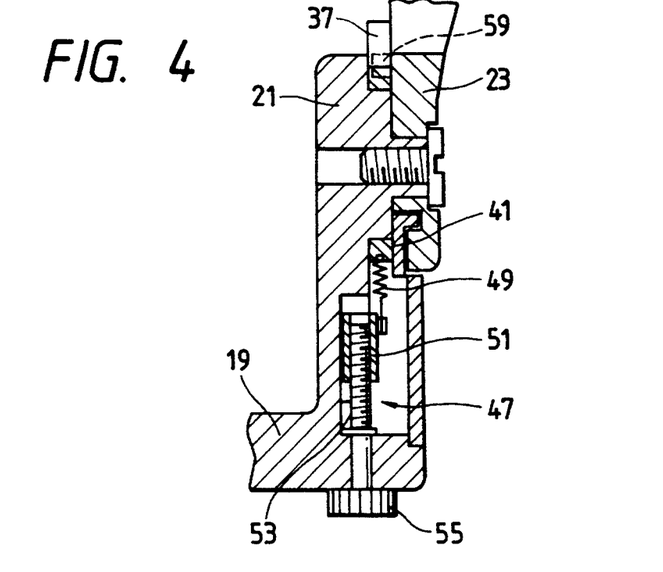
FIG. 4 is a longitudinally sectional view of a bail supporting arm of FIG. 1.

In this embodiment, as shown in FIGS. 2 to 4, an engagement member 37 is disposed coaxially with the bail supporting member 23 so as to freely rotate between the bail supporting member 23 and the bail supporting arms 21.

In addition, the bail supporting member 23 is distribution-urged by a known type distribution-urging means into a fishline winding position as illustrated in FIG. 2 and a fishline releasing position as illustrated in FIG. 3.

The distribution-urging means 39 is constituted of an actuating rod 41 and a coil spring 43.

On the outer circumference of the engagement member 37 is formed a fishline engaging portion 45 for engaging the fishline 33 when the bail supporting member 23 is located at the fishline releasing portion.

The engagement member 37 is urged by an engagement member urging means 47 in the same direction as that of the rotation of the bail supporting member 23 to a fishline releasing side.

The engagement member urging means 47 consists of a spring 49, a slide member 51, a screw 53 and a knob 55.

An end of the spring 49 is connected to the engagement member 37 and the other end is connected to the slide member 51.

The slide member 51 is freely movably guided along a guide portion 57 formed in the bail supporting arms 21. To the slide member 51 is threaded an end of the screw 53.

The other end of the screw 53 protrudes from the bottom portion of the bail supporting arms 21 and the knob 55 is fixed thereto.

On the bail supporting member 23 is formed an interlocking member 59 protruding to the engagement member 37 side, which consists of a protrusion for interlocking the engagement member 37 with the bail supporting member 23 to the fishline winding position.

Further, in the bail supporting arms 21 is formed a retaining portion 60 which is a retaining means for retaining the engagement member 37 at a fishline engaged position when the bail supporting member 23 is located at the fishline releasing position.

In the spinning reel for fishing constructed as mentioned above, when pulling force caused in accordance with the hitting of fish is exerted onto the fishline 33 engaged on the fishline engaging portion 45 of the engagement member 37, under a state when the bail supporting member 23 is located at the fishline releasing position, the engagement member 37 rotates in the direction for disengaging the fishline 33 from the fishline engaging portion 45 against the urging force of the engagement member urging unit 47, so that the fishline 33 is disengaged from the engagement member 37.

When the engagement member 37 is rotated to a position where the fishline 33 is disengaged, the engagement member 37 is returned to an original position in accordance with the urging force of the engagement member urging unit 47.

When the fish sufficiently bites at the bait, the bail supporting member 23 is returned to the fishline winding position from the fishline releasing position through a reversing mechanism by the operation of the handle 35 or a direct manual operation. Then, the engagement member 37 is rotated by interlocking with the bail supporting member 23 in accordance with the interlocking operation of the interlocking member 59 of the bail supporting member 23, and positioned at the fishline releasing position.

In the spinning reel for fishing constructed as mentioned above, when the pulling force of the fish biting at the bait of a device which is thrown into a prescribed point exceeds the urging force of the engagement member 37 which is predetermined by the engagement member urging unit 47, the engagement member 37 is rotated to a direction shown by an arrow A in FIG. 3 and to a position shown by virtual lines shown in FIG. 3. Then, the fishline 33 is disengaged from the fishline engaging portion 45 of the engagement member 37, so that the fishline 33 is smoothly delivered to the pulling force of the fish. The fish can be, therefore, made to bite at the bait without making it feel unnatural force.

As a result, the fish readily bites at the bait and does not spit out the bait in the middle of its biting.

Additionally, in the spinning reel for fishing constructed as mentioned above, since the urging force of the engagement member urging unit 47 for exerting the urging force onto the engagement member 37 can be adjusted, the urging force may be easily set to an optimum state in accordance with the sort of fish or the like.

Namely, in this embodiment, when the knob 55 is rotated, the slide member 51 moves along the guide portion 57, whereby the tension of the spring 49 is adjusted, so that the urging force of the engagement member urging unit can be easily and surely changed.

Figure 5:
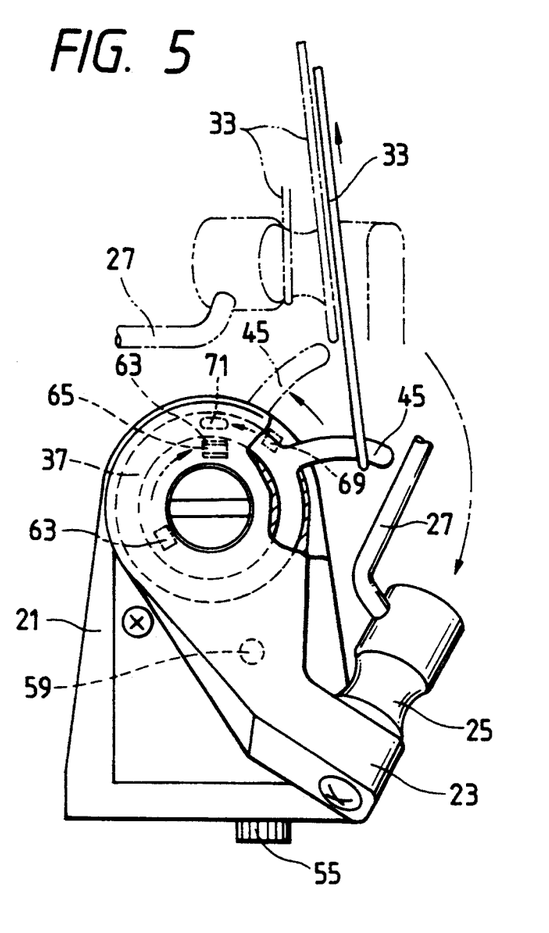
FIG. 5 is a side view of a bail supporting arm of a spinning reel for fishing of a second embodiment of the present invention.
Figure 6:
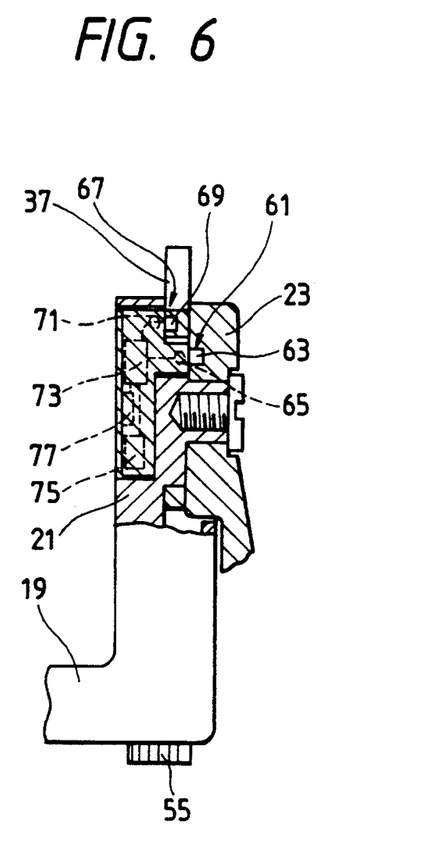
FIG. 6 is a partly longitudinally sectional view of FIG. 5.

FIGS. 5 and 6 show another embodiment of the present invention. In this embodiment, a fishline releasing position detecting unit 61 for outputting a fishline releasing position signal is provided when a bail supporting member 23 is located at a fishline releasing position.

This fishline releasing position detecting unit 61 is constituted of a magnet 63 embedded in the bail supporting member 23 and a lead switch 65 disposed in bail supporting arms 21. The magnet 63 and the lead switch 65 are so disposed to be opposed and adjacent to each other when the bail supporting member 23 is located at the fishline releasing position, as shown in FIG. 5. When the magnet 63 and the lead switch 65 are so positioned as to be adjacent to each other, the fishline releasing position signal is output from the lead switch 65.

In this embodiment, is disposed an engagement member rotation detecting unit 67 for detecting that an engagement member 37 is rotated to a position where a fishline 33 is disengaged from a fishline engaging portion 45 because of the pulling force of fish caused by the hitting of the fish and outputting an engagement member rotation signal.

This engagement member rotation detecting unit 67 is constituted of a magnet 69 embedded in the engagement member 37 and a lead switch 71 disposed in the bail supporting arms 21. The magnet 69 and the lead switch 71 are so arranged as to be opposed and adjacent to each other when the engagement member 37 is located at the fishline releasing position, as shown in FIG. 5. When the magnet 69 and the lead switch 71 are made adjacent to each other, the engagement member rotation signal is output from the lead switch 71.

In the bail supporting arms 21, is accommodated a controller 73 consisting of a microcomputer. To the controller 73 are connected the lead switches 65, 71, an alarm 75 consisting of a buzzer and a power source 77 of a battery.

Figure 7:
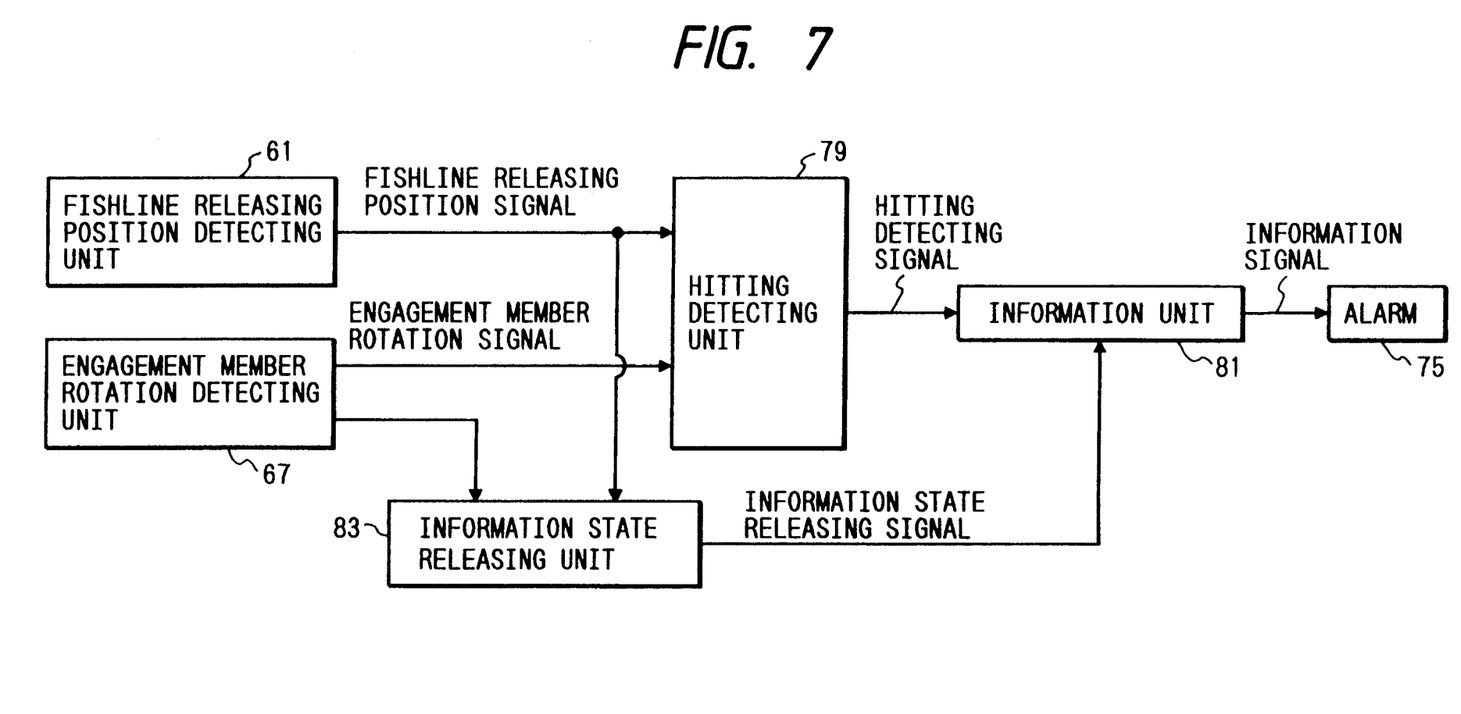
FIG. 7 is a block diagram of a controller of FIG. 6.

FIG. 7 shows a block diagram of the controller 73. Reference numeral 61 denotes the above-described fishline releasing position detecting unit for outputting the fishline releasing position signal and numeral 67 designates the above-described engagement member rotation detecting unit for outputting the engagement member rotation signal.

Reference numeral 79 designates a hitting detecting unit for outputting a hitting detecting signal when the fishline releasing position signal is input and the engagement member rotation signal is input.

Reference numeral 81 designates an information unit to which the hitting detecting signal is input and which outputs an information signal for informing of the hitting of the fish to the alarm 75.

Reference numeral 83 denotes an information state releasing unit for outputting an information state releasing signal for releasing the information state of the information unit 81 when the engagement member rotation signal is input and the fishline releasing signal is not input.

In the spinning reel for fishing constructed as mentioned above, in the case where the bail supporting member 23 is positioned at the fishline releasing position, as shown in FIG. 5, the magnet 63 and the lead switch 65 are brought into a state where they are adjacent to each other, so that the fishline releasing position signal is output from the fishline releasing position detecting unit 61.

Then, when the pulling force of the fish which is generated by the fish hitting upon the device exerts on the fishline 33 engaged in the fishline engaging portion 45 of the engagement member 37, the engagement member 37 is rotated to the direction for disengaging the fishline 33 from the fishline engaging portion 45 against the urging force of an engagement member urging unit 47. The fishline 33 is, therefore, disengaged from the engagement member 37.

When the engagement member 37 is rotated to a position where the fishline 33 is disengaged therefrom, the magnet 69 and the lead switch 71 are disposed at a position where they are adjacent to each other, in FIG. 5, so that the engagement member rotation signal is output from the engagement member rotation detecting unit 67.

At this time, since the fishline releasing position signal and the engagement member rotation signal are simultaneously input to the hitting detecting unit 79, the hitting detecting signal is output from the hitting detecting unit 79 and the information signal is output from the information unit 81 to thereby actuate the alarm 75 and inform a fisherman of the hitting of the fish.

When the fish completely bites at the bait, the bail supporting member 23 is returned from the fishline releasing position to a fishline winding position through a reversing mechanism by the operation of a handle 35 or a directly manual operation. Then, the engagement member 37 is rotated by interlocking with the bail supporting member 23 is accordance with the interlocking operation of an interlocking member 59 of the bail supporting member 23, so that it is positioned at the fishline releasing position.

Consequently, the engagement member rotation signal is output to the information state releasing unit 83 form the engagement member rotation detecting unit 67. At this time, however, the fishline releasing position signal is not output from the fishline releasing position detecting unit 61, so that the information state releasing signal is output from the information state releasing unit 83 to thereby release the information unit 81.

Figure 8:
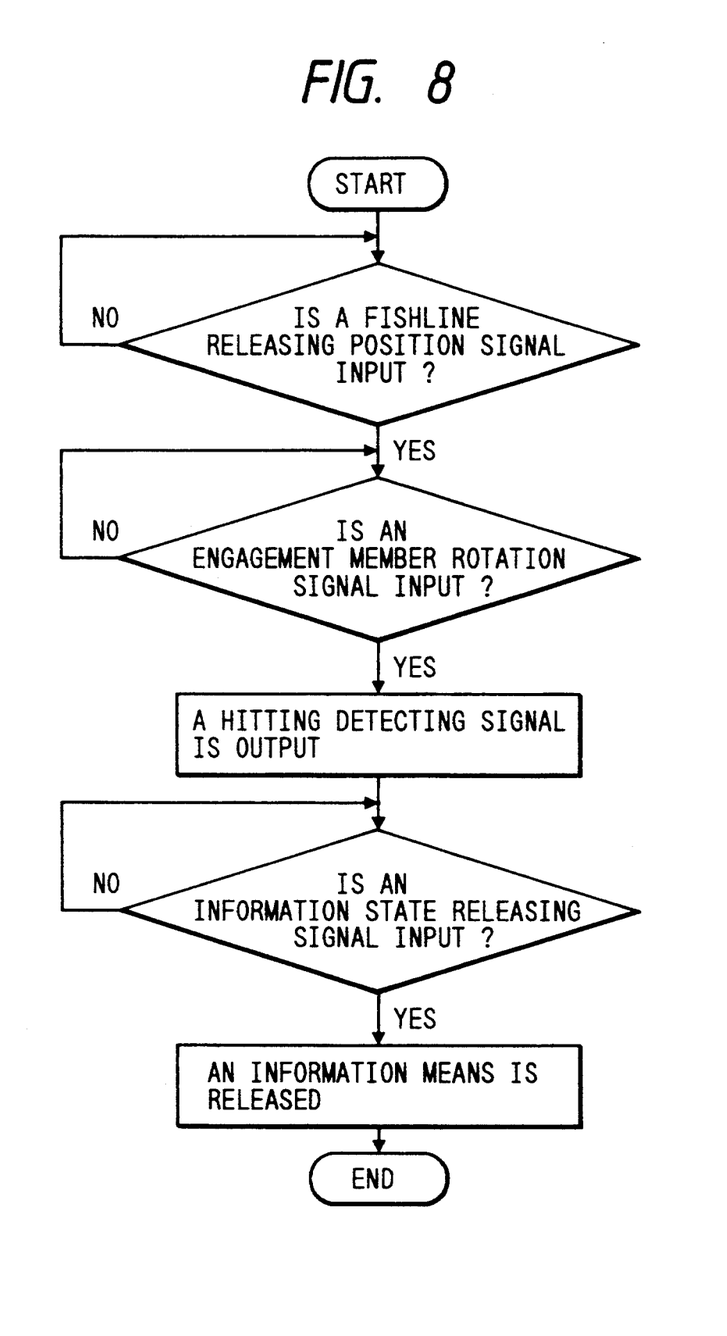
FIG. 8 is a flowchart of the controller of FIG. 6.

FIG. 8 shows a flowchart of a main part of the above-mentioned controller 73. When the fishline releasing position signal is input to the hitting detecting unit 79 from the fishline releasing position detecting unit 61, and the engagement member rotation signal is input thereto from the engagement member rotation detecting unit 67, the hitting detecting signal is output to the information unit 81 from the hitting detecting unit 79. Further, when the information state releasing signal is input to the information unit 81 from the information state releasing unit 83, the information unit 81 is released.

Likewise in the spinning reel for fishing constructed as described above, the effect substantially the same as that of the embodiment mentioned before can be obtained. According to the present embodiment, since, when the pulling force of the fish caused due to the hitting of the fish is applied onto the fishline 33 engaged in the fishline engaging portion 45 of the engagement member 37 so that the engagement member 37 is rotated to the direction for disengaging the fishline 33 from the fishline engaging portion 45 against the urging force of the engagement member urging unit 47 to thereby disengage the fishline 33 from the engagement member 37, the alarm 75 consisting of a buzzer is sounded so as to inform the fisherman of the hitting of the fish, the hitting of the fish upon the device can be surely recognized and the operation can be carried out suitably and timely so as to meet the hitting of the fish upon the device, which contributes to the improvement in the result of fishing.

In the operation conducted for meeting the hitting of the fish, for example, when the handle 35 is actuated to rotate, the engagement member 37 rotates to the fishline releasing position by interlocking with the rotation of the bail supporting member 23 to the fishline winding position to thereby automatically release the information by the information unit 81. A comfortable fishing operation can be, therefore, effected without making the fisherman uncomfortable.

The fishline engaging portion 45 of the engagement member 37 for retaining the fishline 33 while waiting for the biting of the fish is a simple protrusion formed in a circular arc shape, so that the engagement of the fishline 33 on the fishline engaging portion 45 is easily facilitated. Further, since the fishline engaging portion 45 of such a shape is not liable to apply a damage to the fishline 33 and a prescribed drag force is constantly exerted onto a spool 29, the spool 29 is not subject to a risk that it excessively rotates to thereby make the fishline 33 entangled as in the conventional spinning reel for fishing.

According to the embodiment mentioned above, although the buzzer is employed for the alarm 75, the present invention is not to be restricted to it. It will be readily appreciated that for example, a light emitter such as a lamp may be employed.

Figure 9:
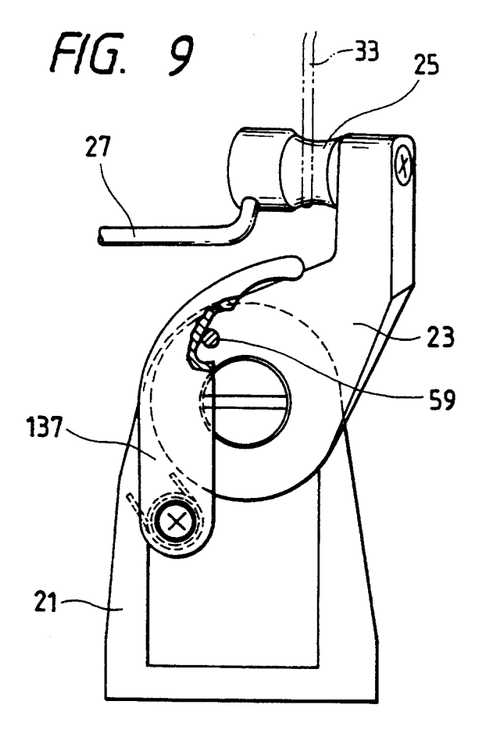
FIG. 9 is a side view showing a state in which a bail supporting member of the spinning reel of the third embodiment is located at a fishline winding position.
Figure 10:
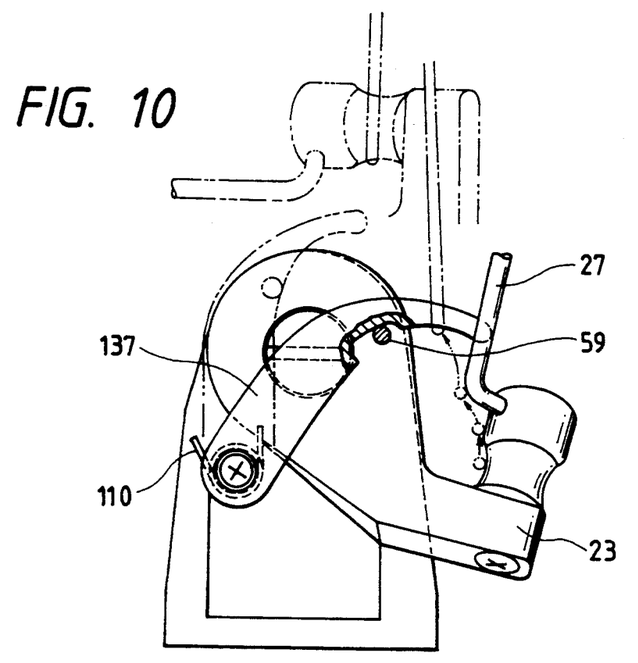
FIG. 10 is a side view showing a state in which the bail supporting member of the spinning reel of the third embodiment is located at a fishline releasing position.

FIGS. 9 and 10 show another embodiment of the present invention. In this embodiment, an engagement member 137 is not disposed coaxially with the bail supporting member 23. More specifically, the engagement member 137 is pivotally supported on the outer surface of the bail supporting arm 21 so as to be shifted from the axis of the bail supporting member 23. An interlocking member 59 is protruded from the outer surface of the bail supporting member 23. The interlocking member 59 serves to operation for retaining the engagement member 137 at a fishline engaged position when the bail supporting member 23 is located at the fishline releasing position. An engagement portion is formed to inside of the engagement member 137 and is engaged with the interlocking member 59. The engagement member 137 is spring-urged by an urging member 110. In all other respects, the embodiment of the present invention shown in FIGS. 9 and 10 is identical to that of the embodiments shown in FIGS. 1 to 8.

The advantageous effects of the present invention are as follows.

According to the first aspect of the invention, when the pulling force of fish caused due to the hitting of fish is exerted onto the fishline, the engagement member is rotated so that the fishline is disengaged therefrom, thereby enable the fishline to be smoothly delivered. Therefore, the fish can be made to bite at the bait without making it feel unnatural resistance force, which results in the complete biting of fish at the bait.

According to the second aspect of the invention, since the engagement member is rotatably supported concentrically to the bail supporting member, the mechanism can be appropriate to a compact reel.

According to the third aspect of the invention, the engagement member for engaging the fishline when the bail supporting member is located at the fishline releasing portion, can be easily provided to the most appropriate position without limitation of space and its shape. In addition, since the engagement member is not rotated by pulling force of fish in a large angle, the engagement of the fishline can be smoothly released so that the fishline can be smoothly delivered, thereby preventing the fishline from undesirably damaging.

In the spinning reel for fishing according to the fourth aspect of the invention, since the urging force of the urging member can be adjusted, the urging force can be preset to an optimum value in accordance with the kind of fish or the like.

Furthermore, with respect to the spinning reel according to the fifth aspect of the present invention, the hitting of the fish can be surely recognized and the operation to meet the hitting of the fish can be properly and timely carried out, which contributes to the improvement, in the result of fishing. In the operation for meeting the hitting of the fish, when the handle is actuated in the direction for winding the fishline, the information states is actuated to thereby stop the information means, so that a comfortable fishing operation can be effected without making the fisherman uncomfortable.

It is noted that the present invention is not confined to the embodiments described above, but may be embodied or practiced in other ways without departing from the spirit or essence of the invention.

What is claimed is:

1. A spinning reel for fishing including a spool supported by a reel main body and making a traverse movement in accordance with a winding operation of a handle, a rotor rotatably supported by the reel main body and rotating in accordance with the winding operation of the handle, a bail supporting member rotatably mounted on a bail supporting arm of the rotor and to which a bail is secured, and a distribution-urging means for distribution-urging the bail supporting member into a fishline winding position and a fishline releasing position, said spinning reel comprising:

an engagement member having a fishline engaging portion for engaging with a fishline when said bail supporting member is located at the fishline releasing position, wherein said engagement member is rotatably supported concentrically with respect to said bail supporting member;

urging means for urging said engagement member in a same direction of rotation as a rotating direction of the bail supporting member to the fishline releasing position;

interlocking means for rotating said engagement member as a consequence of movement of the bail supporting member into the fishline winding position; and retaining means for retaining said engagement member at a fishline engaged position when said bail supporting member is located at the fishline releasing position.

2. A spinning reel for fishing according to claim 1, wherein said engagement member is pivotally supported to the bail supporting arm so as to be shifted from an axis of the bail supporting member.

3. The spinning reel for fishing according to claim 1, wherein an urging force of said urging means is adjustable.

4. A spinning reel for fishing according to claim 1, further comprising:

fishline releasing position detecting means for outputting a fishline releasing position signal when the bail supporting member is located at the fishline releasing position; and engagement member rotation detecting means for detecting that the engagement member is rotated to a position in which the fishline is disengaged from the fishline engaging portion in accordance with the pulling force of fish due to the hitting of the fish to thereby output an engagement member rotation signal.

5. A spinning reel for fishing according to claim 4, further comprising:

hitting detecting means for outputting a hitting detecting signal when the fishline releasing position signal is input, and the engagement member rotation signal is input;

information means to which the hitting detecting signal is input and which informs of the hitting of the fish; and information state releasing means for outputting an information state releasing signal adapted to release the information state of the information means when engagement member rotation signal is input and the fishline releasing position signal is not input.

* * * * *